United States Patent [19]

Jeremiah

[11] Patent Number: 5,398,321
[45] Date of Patent: Mar. 14, 1995

[54] MICROCODE GENERATION FOR A SCALABLE COMPOUND INSTRUCTION SET MACHINE

[75] Inventor: Thomas L. Jeremiah, Endwell, N.Y.

[73] Assignee: International Business Machines Corporation, Armonk, N.Y.

[21] Appl. No.: 184,401

[22] Filed: Jan. 21, 1994

Related U.S. Application Data

[63] Continuation of Ser. No. 653,006, Feb. 8, 1991, abandoned.

[51] Int. Cl.⁶ ............................ G06F 9/22; G06F 9/38
[52] U.S. Cl. ..................... 395/375; 364/DIG. 1; 364/DIG. 2; 364/231.8; 364/230; 364/931.41; 364/946.9; 364/948.3; 364/262.4
[58] Field of Search ........................................ 395/375

[56] References Cited

U.S. PATENT DOCUMENTS

| | | | |
|---|---|---|---|
| 4,295,193 | 10/1981 | Pomerene | 395/375 |
| 4,376,976 | 3/1983 | Lahti et al. | 395/375 |
| 4,439,828 | 3/1984 | Martin | 364/200 |
| 4,594,655 | 6/1986 | Hao et al. | 395/775 |
| 4,825,363 | 4/1989 | Baumann et al. | 395/375 |
| 4,858,105 | 8/1989 | Kuriyama et al. | 395/375 |
| 4,942,525 | 7/1990 | Shintani et al. | 395/375 |
| 4,967,343 | 10/1990 | Ngai et al. | 395/800 |
| 5,005,118 | 4/1991 | Lenoski | 395/375 |
| 5,051,940 | 9/1991 | Vassiliadis et al. | 364/736 |
| 5,117,490 | 5/1992 | Duxbury et al. | 395/375 |
| 5,129,067 | 7/1992 | Johnson | 395/375 |
| 5,140,545 | 8/1992 | Vassiliadis et al. | 364/765 |
| 5,155,819 | 10/1992 | Watkins et al. | 395/375 |
| 5,163,139 | 11/1992 | Haigh et al. | 395/375 |
| 5,229,321 | 2/1993 | Iizuka | 395/375 |
| 5,241,636 | 8/1993 | Kohn | 395/375 |
| 5,287,467 | 2/1994 | Blaner et al. | 395/375 |
| 5,295,249 | 3/1994 | Blaner et al. | 395/375 |
| 5,299,319 | 3/1994 | Vassiliadis et al. | 395/375 |
| 5,301,341 | 4/1994 | Vassiliadis et al. | 395/800 |
| 5,303,356 | 4/1994 | Vassiliadis | 395/375 |

FOREIGN PATENT DOCUMENTS

| | | |
|---|---|---|
| 0045634 | 2/1982 | European Pat. Off. . |
| 0184158 | 6/1986 | European Pat. Off. . |
| 0397414 | 11/1990 | European Pat. Off. . |
| 2293932 | 12/1990 | Japan . |

OTHER PUBLICATIONS

Acosta, R. D., et al, "An Instruction Issuing Approach to Enhancing Performance in Multiple Functional Unit Processors", IEEE Transactions on Computers, Fall, C-35 No. 9, Sep. 1986, pp. 815–828.

Anderson, V. W., et al, the IBM System/360 Model 91: "Machine Philosophy and Instruction Handling", computer structures: Principles And Examples (Siewiorek, et al, ed (McGraw-Hill, 1982, pp.276–292.

Capozzi, A. J., et al, "Non-Sequential High-Performance Processing" IBM Technical Disclosure Bulletin, vol. 27, No. 5, Oct. 1984, pp. 2842–2844.

Chan, S., et al, "Building Parallelism into the Instruction Pipeline", High Performance Systems, Dec., 1989, pp. 53–60.

(List continued on next page.)

Primary Examiner—Parshotam S. Lall
Assistant Examiner—Timothy Philipp
Attorney, Agent, or Firm—Lynn L. Augspurger; Terrance A. Meador

[57] ABSTRACT

An apparatus for generating microcode in a scalable compound instruction set machine operates in response to compounding information indicating that two or more adjacent instructions are to be executed in parallel. Separate and independent microcode is held in control store for each possible instruction in a group. Microcode sequences for each instruction of a group of instructions to be executed in parallel are merged in response to the compounding information into a single microinstruction sequence.

9 Claims, 7 Drawing Sheets

OTHER PUBLICATIONS

Murakami, K., et al., "SIMP (Single Instruction Stream/Multiple Instruction Pipelining)": A Novel High-Speed Single Processor Architecture, Proceedings of the Sixteenth Annual Symposium On Computer Architecture, 1989, pp. 78–85.

Smith, J. E., "Dynamic Instructions Scheduling and the Astronautics ZS-1", IEEE Computer, Jul., 1989, pp. 21–35.

Smith, M. D., et al, "Limits on Multiple Instruction Issue", ASPLOS III, 1989, pp. 290–302.

Tomasulo, R. M., "An Efficient Algorithm for Exploiting Multiple Artihmetic Units", Computer Structures, Principles, and Examples (Siewiorek, et al ed), McGraw-Hill, 1982, pp. 293–302.

Wulf, P. S., "The WM Computer Architecture", Computer Architecture News, vol. 16, No. 1, Mar. 1988, pp. 70–84.

Jouppi, N. P., et al, "Available Instruction-Level Parallelism for Superscalar Pipelined Machines", ASPLOS III, 1989, pp. 272–282.

Jouppi, N. P., "The Non-Uniform Distribution of Instruction-Level and Machine Parallelism and its Effect on Performance", IEEE Transactions On Computers, vol. 38, No. 12, Dec., 1989, pp. 1645–1658.

Ryan, D. E., "Entails 80960: An Architecture Optimized for Embedded Control", IEEE Microcomputers, vol. 8, No. 3, Jun., 1988, pp. 63–76.

Colwell, R. P., et al, "A VLIW Architecture for a Trace Scheduling Complier", IEEE Transaction On Computers, vol. 37, No. 8, Aug., 1988, pp. 967–979.

Fisher, J. A., "The VLIW Machine: A Multi-Processor for Compiling Scientific Code", IEEE Computer, Jul., 1984, pp. 45–53.

Berenbaum, A. D., "Introduction to the CRISP Instruction Set Architecture", Proceedings Of Compcon, Spring, 1987, pp. 86–89.

Bandyopadhyay, S., et al, "Compiling for the CRISP Microprossesor", Proceedings Of Compcon, Spring, 1987, pp. 96–100.

Hennessy, J., et al, "MIPS: A VSI Processor Architecture", Proceedings Of The CMU Conference On VLSI Systems And Computations, 1981, pp. 337–346.

Patterson, E. A., "Reduced Instruction Set Computers", Communications Of The ACM, vol. 28, No. 1, Jan., 1985, pp. 8–21.

Radin, G., "The 801 Mini-Computer", IBM Journal Of Research And Development, vol. 27, No. 3, May, 1983, pp. 237–246.

Ditzel, D. R., et al, "Branch Folding in the CRISP Microprocessor: Reducing Branch Delay to Zero", Proceedings Of Compcon, Spring 1987, pp. 2–9.

Hwu, W. W., et al, "Checkpoint Repair for High-Performance Out-of-Order Execution Machines", IEEE Transactions On Computers vol. C36, No. 12, Dec., 1987, pp. 1496–1594.

Lee, J. K. F., et al, "Branch Prediction Strategies in Branch Target Buffer Design", IEEE Computer, vol. 17, No. 1. Jan. 1984, pp. 6–22.

Riseman, E. M., "The Inhibition of Potential Parallelism by Conditional Jumps", IEEE Transactions On Computers, Dec., 1972, pp. 1405–1411.

Smith, J. E., "A Study of Branch Prediction Strategies", IEEE Proceedings Of The Eight Annual Symposium On Computer Architecture, May 1981, pp. 135–148.

Archibold, James, et al, Cache Coherence Protocols: "Evaluation Using a Multiprocessor Simulation Model", ACM Transactions On Computer Systems, vol. 4, No. 4, Nov. 1986, pp. 273–398.

Baer, J. L., et al, "Multi-Level Cache Hierarchies: Organizations, Protocols, and Performance" Journal Of Parallel And Distributed Computing vol. 6, 1989, pp. 451–476.

Smith, A. J., "Cache Memorie", Computing Surveys, vol. 14, No. 3 Sep., 1982, pp. 473–530.

Smith, J. E., et al, "A Study of Instruction Cache Oraganizations and Replacement Policies", IEEE Proceedings Of The Tenth Annual International Symposium On Computer Architecture, Jun., 1983, pp. 132–137.

Vassiliadis, S., et al, "Condition Code Predictory for Fixed-Arithmetic Units", International Journal Of Electronics, vol. 66, No. 6, 1989, pp. 887–890.

Tucker, S. G., "The IBM 3090 System: An Overview", IBM Systems Journal, vol. 25, No. 1, 1986, pp. 4–19.

IBM Publication No. SA22-7200-0, Principles of Operation, IBM Enterprise Systems Architecture/370, 1988.

The Architecture Of Pipelined Computers, by Peter M. Kogge Hemisphere Publishing Corporation, 1981.

IBM Technical Disclosure Bulletin (vol. 33 No. 10A, Mar. 1991) by R. J. Eberhard.

"Self Aligning End of Instruction and Next Instruction Load", Research Disclosure, Jul. 1989, No. 303, p. 519.

MICROCODE GENERATION FOR A SCALABLE COMPOUND INSTRUCTION SET MACHINE

CROSS-REFERENCE TO RELATED APPLICATION

This application is a continuation of application Ser. No. 07/653,006, filed Feb. 8, 1991, now abandoned.

CROSS REFERENCE TO RELATED APPLICATIONS

The present U.S. patent application is related to the following co-pending U.S. patent applications:

(1) Application Ser. No. 07/519,382 (IBM Docket EN9-90-020), filed May 4, 1990, entitled "Scalable Compound Instruction Set Machine Architecture", the inventors being Stamatis Vassiliadis et al;

(2) Application Ser. No. 07/519,384 (IBM Docket EN9-90-019), filed May 4, 1990, entitled "General Purpose Compound Apparatus for Instruction-Level Parallel Processors", the inventors being Richard J. Eickemeyer et al;

(3) Application Ser. No. 07/504,910 (IBM Docket EN9-90-014), now U.S. Pat. No. 5,051,940 filed Apr. 4, 1990, entitled "Data Dependency Collapsing Hardware Apparatus", the inventors being Stamatis Vassiliadis et al;

(4) Application Ser. No. 07/522,291, now U.S. Pat. No. 5,214,763, filed May 10, 1990, entitled "Compounding Preprocessor for Cache", the inventors being Bartholmew Blaner et al;

(5) Application Ser. No. 07/543,464, filed Jun. 26, 1990, entitled "An In-Memory Preprocessor for a Scalable Compound Instruction set Machine Processor", the inventors being Richard J. Eickemeyer et al;

(6) Application Ser. No. 07/543,458, now U.S. Pat. No. 5,197,135, filed Jun. 26, 1990, entitled "Memory Management for Scalable Compound Instruction Set Machines with In-Memory Compounding", the inventors being Richard J. Eickemeyer et al;

(7) Application Ser. No. 07/619,868, filed Nov. 28, 1990, now U.S. Pat. No. 5,301,341, entitled "Overflow Determination for Three-Operand ALUS in a Scalable Compound Instruction Set Machine", the inventors being Stamatis Vassiliadis et al; and (8) Application Ser. No. 07/642,011, filed Jan. 15, 1991, now U.S. Pat. No. 5,295,249, entitled "Compounding Preprocessor for Cache", the inventors being B. Blaner et al. (A continuation-in-part of U.S. patent application Ser. No. 07/522,291, now U.S. Pat. No. 5,197,135 filed May 10, 1990).

These co-pending applications and the present application are owned by one and the same assignee, namely, INTERNATIONAL BUSINESS MACHINES CORPORATION of Armonk, N.Y.

The descriptions set forth in these co-pending applications are hereby incorporated into the present application by this reference thereto.

BACKGROUND OF THE INVENTION

This invention relates to digital computers and digital data processors and particularly to digital computers and data processors capable of processing two or more instructions in parallel.

The performance of traditional computers which execute instructions singly in a sequential manner has improved significantly in the past largely due to improvements in circuit technology. Machines which execute instructions one at a time are sometimes referred to as "scalar" computers or processors. As circuit technology is pushed to its limits, computer designers have had to investigate other means to obtain significant performance improvements.

Recently, so-called "superscalar" computers have been proposed which attempt to increase performance by selectively executing more than one instruction at a time from a single instruction stream. Superscalar machines typically decide at instruction execution time if a given number of instructions may be executed in parallel. Such a decision is based on the operation codes (OP codes) of the instructions and on data dependencies which may exist between adjacent instructions. The OP codes determine the particular hardware components each of the instructions will utilize and, in general, it is not possible for two or more instructions to utilize the same hardware component at the same time nor to execute one of the instructions if it depends on the results of another of the instructions (a "data dependency" or "data interlock"). These hardware and data dependencies prevent the parallel execution of some instruction combinations. In these cases, instructions are instead executed by themselves in a non-parallel manner. This, of course, reduces the performance of a superscalar machine.

Superscalar computers provide some improvement in performance but also have disadvantages which it would be desirable to minimize. For example, deciding at instruction execution time which instructions can be executed in parallel takes a significant amount of time which cannot be very readily masked by overlapping the decision with other normal machine operations. This disadvantage becomes more pronounced as the complexity of the instruction set architecture increases. Another disadvantage is that the decision making must be repeated if the same instructions are to be executed a second or further time.

The cross-referenced applications all concern a digital computer or data processor called a scalable compound instruction set machine (SCISM) in which the performance of the parallel execution decision is made prior to execution time. In SCISM architecture, the decision to execute in parallel is made early in the overall instruction handling process. For example, the decision can be made ahead of the instruction buffer in those machines which have instruction buffers or instruction stacks or ahead of the instruction cache in those machines which flow the instructions through a cache unit.

Because the decision to execute in parallel is made prior to a point where instructions are stored, the results of the decision making can be preserved with the instructions and reused in the event that the same instructions are used a second or further time.

Preferably, the recording of the parallel execution decision making is in the form of tags which accompany the individual instructions in an instruction stream. These tags tell whether the instructions can be executed in parallel or whether they need to be executed one at a time. This instruction tagging process is sometimes referred to herein as "compounding". It serves, in effect, to combine at least two individual instructions into a single compound instruction for parallel processing purposes.

The exemplary embodiment of a SCISM is underpinned by the architecture and instructions of the System/370 product family available from the IBM Corporation, Armonk, N.Y., the assignee of this application. Preferably, the SCISM compounds instructions while they are in object form. As is known, System/370 architecture typically employs microcoded instructions to implement and control the execution of object-level instructions. Consequently, all System/370 instructions which are executed, either singly or in parallel in a SCISM, are controlled by one or more microinstructions. Microinstruction execution of object instructions is a widely used concept for which many implementations are known. The challenge in executing scalar instructions in parallel is to provide microinstruction sequences which reflect such parallelism.

One approach known to the inventor is implemented in a machine which executes up to two instructions in parallel. This approach provides a unique microcoded routine for all possible pairs of instructions, as well as routines for each instruction individually. While conceptually simple, this approach requires significant additional microcode storage to support the parallel instruction routines. Each pair of instructions which can be executed in parallel becomes, in effect, a new instruction with its own microcode. The storage and management overhead for such an approach can become substantial, adding many unique microcode routines to a standard set of microinstructions. Furthermore, the number of combinations proliferates geometrically with the number of instructions which are executed in parallel.

Consequently, there is a need in computers or processors which can execute two or more instructions simultaneously to provide machine-level instructions for all possible combinations without adding substantially to the overhead required for storing and retrieving the microinstructions.

SUMMARY OF THE INVENTION

It is an object of this invention to provide for the generation of microcode in a scalable compound instruction set machine which groups two or more instructions for parallel execution prior to execution time.

A related object is to devise an efficient mechanism for generating microinstructions in response to pairs of machine-level instructions which have been marked for concurrent execution.

The foregoing objects are satisfied in an apparatus based on the inventor's critical observation that when compounded instructions are encountered during instruction fetch and issue, a microinstruction sequence can be fetched for each of the compounded instructions and merged to produce a single microinstruction sequence able to control the simultaneous execution of the compounded instructions. Using this approach, only a single microinstruction routine need be coded and stored for each individual machine-level instruction, regardless of whether the instruction is compounded with another instruction, or not. A second form of coding is provided for instructions that are executed as the second half of a compound instruction.

The apparatus of the invention is found in a computer in which instructions can be executed singly and in parallel and in which parallel execution of a group of instructions is indicated by compounding information generated prior to the execution of the instruction. However, the invention is not limited to the case where compounding is performed prior to instruction issue. It is only necessary that the instruction issuing mechanism indicate to the microinstruction merging mechanism that the instructions being issued are legitimate candidates for parallel execution. In this context the invention is an apparatus for generating microcode for the group of instructions and includes a first microinstruction storage for providing a first sequence of microinstructions for executing a first instruction of the group of instructions and a second microinstruction storage for providing a second sequence of microinstructions for executing a second instruction of a group of instructions. A merging unit is coupled to the first and second microinstruction storages and combines the first and second sequences of microinstructions into a composite sequence of microinstructions in response to the compounding information, the length of the composite sequence of microinstructions equalling the longer of the first and the second sequence of microinstructions. Last, a series of registers is connected to the merging unit provide for pipelined execution of the composite sequence of microinstructions.

DESCRIPTION OF THE PREFERRED EMBODIMENT

The invention does not reside in the use of microcode to execute machine instructions. However, a computer employing a microcode generator for machine instruction execution does form the environment within which the invention is practiced. Such a computer system can include a machine which executes the instructions of the IBM System/370 instruction set, for example. This set of instructions is explained at length in the work by C. J. Kacmar, entitled "IBM 370 ASSEMBLY LANGUAGE WITH ASSIST", Prentice-Hall, 1988.

When used herein, the term "machine instruction" means an instruction which is in object form. In OPER- ATING SYSTEMS, Second Edition, C. H. Deitel has defined microprogramming as "a layer of programming below a computer's machine language." Expanding Deitel's definition, a microprogram is a collection of microinstructions. A "microinstruction" (or, a "microword") is an instruction "that controls data and sequencing in a processor at a more fundamental level than a machine instruction . . . ", IBM DICTIONARY OF COMPUTING, Eighth Edition, 1987. A group of microinstructions is commonly referred to as "microcode".

As is known, a computer microprogram is typically retained in a portion of computer memory which is not accessible to a programmer. Instead the machine-level instructions of a compiled program are individually mapped to microinstructions in the section of storage referred to as "control store".

Figure 1:
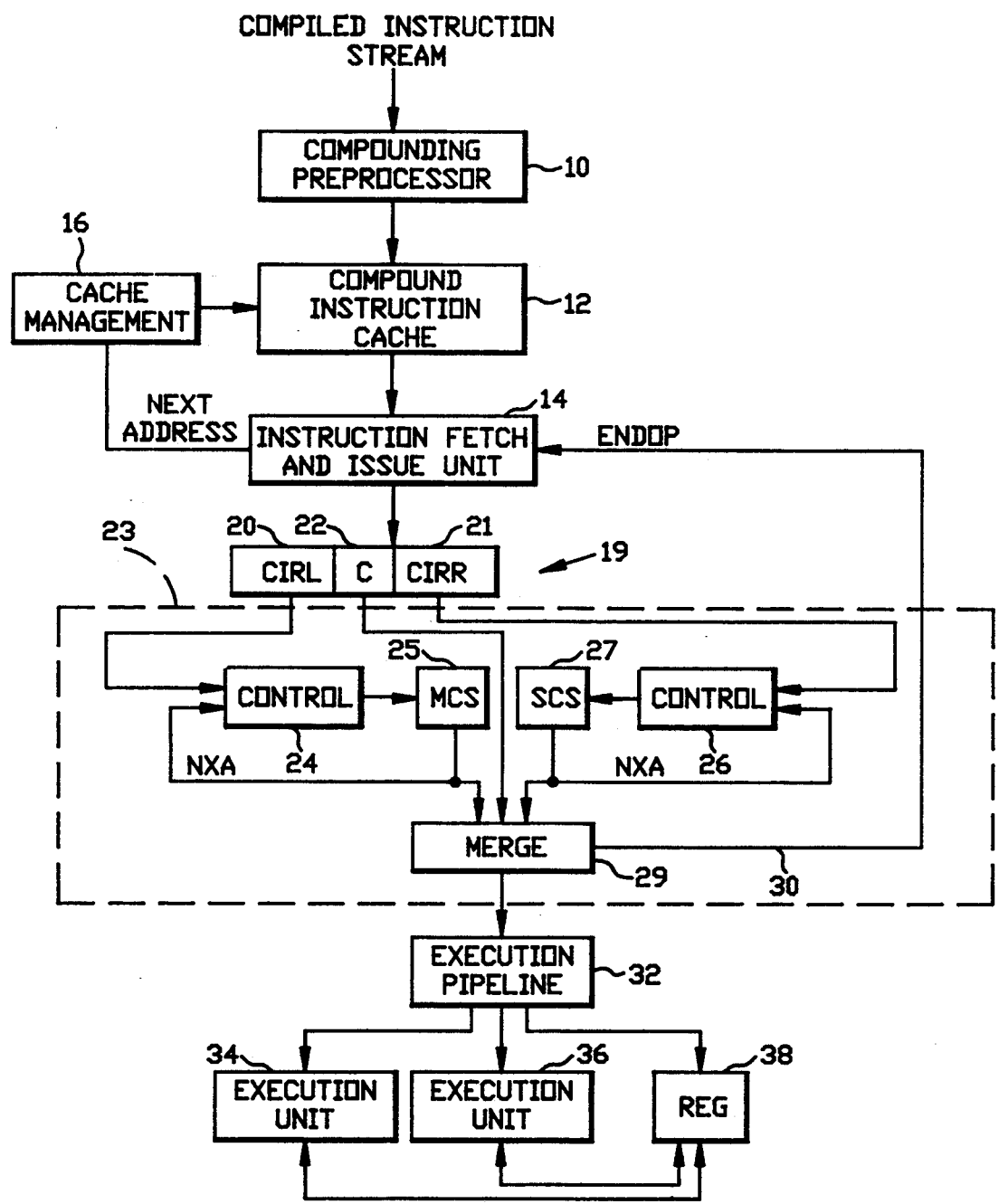
FIG. 1 is a block diagram of a scalable compound instruction set machine which includes an apparatus for generating microcode for compounded instruction pairs.

FIG. 1 illustrates a SCISM architecture in which microprogramming is used to implement and control the execution of machine-level instructions, singly or in pairs. In particular, a machine-level instruction stream is provided to a compounding preprocessor 10. The instruction stream is a sequence of individual instructions which have typically been complied from a source program. The stream is provided to the CPU of a computer for execution. Conventionally, the machine-level instructions are staged into the CPU through a cache 12. Before entry into the cache, the instruction stream is examined by the compounding preprocessor 10 to determine whether at least two adjacent instructions can be concurrently executed. The compounding preprocessor 10 is described in detail in the eighth referenced co-pending U.S. patent application, entitled "COMPOUNDING PREPROCESSOR FOR CACHE", inventors: B Blaner, et al, Ser. No. 07/642,011, filed on Jan. 15, 1991, now U.S. Pat. No. 5,295,249. Also described in this application is the structure of a compounding instruction cache which functions as the cache 12 of FIG. 1.

The operation of the compounding preprocessor 10 results in the generation of compounding information indicating whether adjacent instructions of the compiled instruction stream which have been cached at 12 can be concurrently executed. Thus, for each instruction, the compounding preprocessor 10 generates compounding information indicating whether that instruction and an adjacent instruction can be executed in parallel.

Following processing by the compounding preprocessor 10, the analyzed instructions and the compounding information are stored in the compound instruction cache 12. Except for the provision of extra space to store the compounding information, it is assumed that the cache 12 is operated conventionally. In particular, entries in the cache 12 are typically groups of adjacent instructions ("lines") which are entered into the cache so that they can be quickly obtained as required by an executing program.

In providing the compounding information together with instructions in the cache 12, the SCISM architecture takes fuller advantage of parallelism than a computer which makes the parallel execution decision when instructions are brought out of the cache for immediate execution ("issued"). Relatedly, an instruction in the cache 12 may be used more than once in, for example, a loop or branch. So long as the instruction is in the cache, it does not have to be re-analyzed if obtained again for execution because the compounding information for the instruction which is stored with it in the cache can be reused.

The compounding preprocessor 10 is assumed to be of the type described in the co-pending patent application which generates, for each instruction, a one-bit tag. These tags are used to identify which pairs of instructions may be processed in parallel. Instructions and their tags are supplied to and stored into the compound instruction cache 12. An instruction fetch and issue unit 14 fetches the instructions and their tags from the compound instruction cache 12, as needed, and arranges for their execution by the appropriate one or ones of a plurality of execution units 34, 36. The fetch and issue unit 14 examines the tag and OP codes of fetched instructions. If a tag indicates that two successive instructions are to be processed in parallel, then the fetch and issue unit 14 enters both into a compound instruction register (CIR) 19. The compound instruction register 19 includes a left compound instruction register (CIRL) 20 and a right compound instruction register (CIRR) 21. A bit-wide field is provided in the CIRL 20 for storage of the compounding tag for the first instruction of a compounded pair of instructions. The first instruction is stored in the remainder of the CIRL 20, while the second instruction is stored in the CIRR 21. In the discussion which follows, the first, or left, instruction is assumed to precede the second, or right, instruction in the instruction sequence, and its compounding tag indicates whether or not it is to be executed with the instruction following it. Thus, the first instruction of a compounded pair is stored in the CIRL 20, while the second instruction is stored in the CIRR 21. In the preferred embodiment, the compounding tag is a single bit, hereinafter, a "C-bit", which, if set to a value of "one" indicates that the CIRR 21 contains an instruction which is to be executed simultaneously with the instruction contained in CIRL 20. If set to set "zero" the compounding tag indicates that the contents of CIRR 21 are to be ignored during execution of the instruction contained in CIRL 20.

Figure 2:
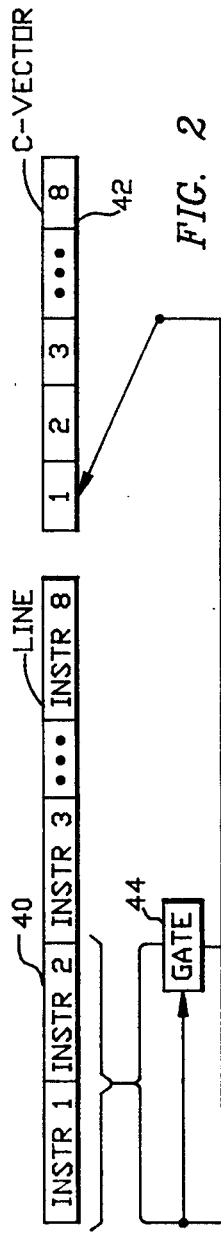
FIG. 2 is a partial schematic diagram showing how compounding information is used to issue compounded instructions.

For example, in FIG. 2 a line of eight instructions 40 is fetched from the cache 12, together with an array of C-bits 42 which is termed a C-vector. The C-vector 42 contains at least eight bits, one for each of the eight instructions in the line 40. Each numbered bit of the C-vector 42 constitutes the C-bit for its respective instruction; for example, C-bit 1 is the compounding tag for instruction 1 (INSTR 1). The instruction fetch and issue unit 14 inspects the instructions in the line 40 in sequence and simultaneously inspects their C-bits. According to the preferred method of compounding, if two instructions are to be executed in parallel, the C-bit for the first instruction is set to one, while the bit for the succeeding instruction is ignored. This is only by way of example and is not intended to limit the mapping of compounding bits to instructions, nor the number of adjacent instructions which can be grouped for compounding. Assuming that the first two instructions of line 40 have been marked for parallel execution, the C-bit for the first instruction has a value of one. The logic of the fetch and issue unit 14 loads the first instruction and its associated C-bit into the CIRL 20 and the C field 22. A gate 44 in the logic of the fetch and issue unit 14 is enabled by decoding the length of the first instruction, which permits the second instruction (INSTR 2) of the line 40 to be loaded into the CIRR 21. Of course, if the value of C-bit 1 is zero, the instruction loaded into CIRR will be subsequently ignored. When execution of the instruction or instructions in the CIR 19 has completed, the fetch and issue unit advances to the next instruction to be executed and operates as described.

The precise structure of the instruction fetch and issue unit 14 is not the subject of this invention, and it is sufficient to say that this unit contains logic which is capable of determining on the basis of its compounding tags whether the next instruction is to be executed singly or in parallel with the instruction which immediately follows it. It is further asserted that this logic implements its decision by appropriately examining the C-bit in the compound instruction register 19 as described above.

At the point where they are entered into the instruction fetch and issue unit 14, instructions are in object code form. When an instruction is entered into the compound instruction register 19, it is decoded by a microcode generator 23 which generates microcode according to the invention. The microcode generator 23 decodes an instruction in the compound instruction register by mapping it to a sequence of microinstructions which are contained in a control store (CS). The sequence may contain one or more microinstructions. The contents of the CIRL 20 are mapped to a first sequence of microinstructions by way of control logic 24 and a main control store (MCS) 25. Simultaneously, the contents, if any, of the CIRR 21 are mapped to a second sequence of microinstructions by control logic 26 and a secondary control store (SCS) 27. If the contents of the C-bit field of the CIRL 20 indicate that an instruction is contained in the CIRR 21, the first sequence of microinstructions output by the MCS 25 is merged in a merge unit 29 with the second sequence of microinstructions output by the SCS 27. If the C-bit indicates that no instruction is contained in the CIRR 21, the merge unit 29 ignores the output of the SCS 27 and passes on the first sequence of microinstructions for execution.

Provision of a microinstruction sequence out of either the MCS 25 or SCS 27 is essentially conventional. In this regard, the MCS 25, for example, stores microinstructions at addressable locations. Conventionally, the address for the first microinstruction of a microinstruction sequence is obtained from a predetermined field of the instruction in the CIRL 20. For example, in the IBM System/370 instruction set, the OP code (the first byte) of an instruction forms the basis for the MCS address location of a microinstruction sequence which has been coded to execute the machine instruction. If the microinstruction sequence is longer than a single microinstruction, each microinstruction of the sequence, save the last, contains the address of the next microinstruction in the sequence in a next address field (NXA). This field is fed back to the control unit 24 to generate the MCS address of the next microinstruction sequence. The first microinstruction of a sequence is found by appending zeros (or another predetermined value) to the OP code of the CIRL instruction; the microinstruction sequence is followed by the NXA field contents of succeeding microinstructions.

Typically, microinstructions in the MCS 25 will include a field to indicate when the end of the sequence is reached. Thus, the only microinstruction in a single-microinstruction sequence and the last microinstruction of a multi-microinstruction sequence will contain an indication in this field (the EOP or end-of-operation field) signalling the end of the operation. In SCISM architecture, the EOP field is bit-wide. When the bit in this field is set, the end of the operation is signified; when not set, the operation continues. Typically, detecting of a set EOP bit results in a generation of an end-of-operation (ENDOP) signal provided to the fetch and issue unit 14 signalling it to issue another instruction for execution, which also initiates the OP breakout process.

Returning to the description of FIG. 1, microinstruction sequences are passed by the merge unit 29 to an execution pipeline 32 which controls two or more execution units 34, 36, and a bank of registers 38 which can include general purpose and storage address registers.

The merge unit 29 passes to the execution pipeline 32 only the microinstruction fields which are appropriate for controlling the operations of the execution units 34 and 36 and the transfer of data between those units and the registers 38. Relatedly, the microinstructions are passed to the execution pipeline 32 shorn of microprogramming addressing and branching fields and the EOP field. The remaining fields are to control operations necessary to execute the instruction or instructions. As detailed below, certain fields are dedicated to controlling the operations of the first execution unit 34, while other fields are allocated for controlling the operations of the second execution unit 36. If a potentially-compoundable instruction is being executed singly (perhaps due to the lack of a subsequent instruction suitable for compounding), only the execution unit 34 is operated. Non-compoundable instructions are free to use both execution units 34 and 36. Parallel execution implies concurrent operation of the execution units 34 and 36 in response to the execution pipeline 32.

Figure 3:
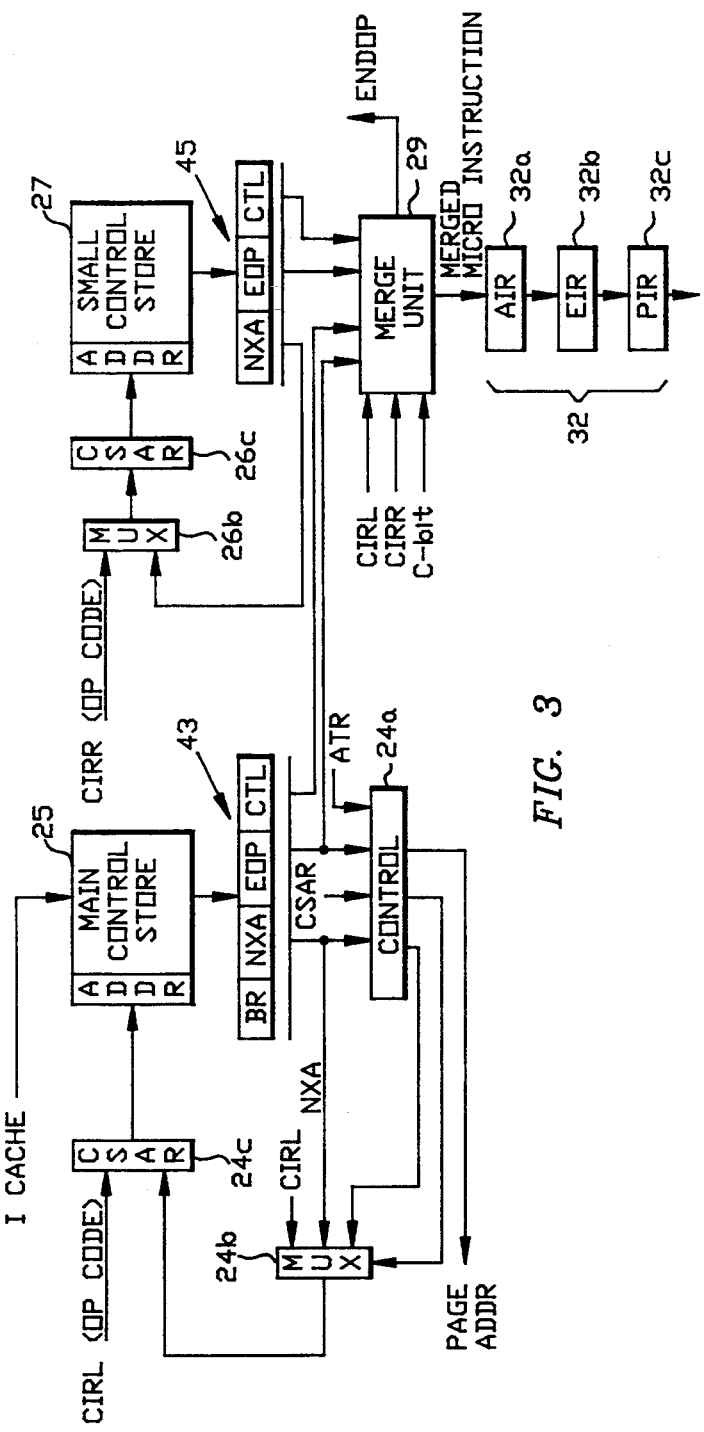
FIG. 3 is a block diagram showing the principal elements of the apparatus of the invention.

The microcode generator 23 is shown in more detail in FIG. 3. As will be discussed below, the fundamental microinstruction format is inherent in the microinstructions stored in the MCS 25. The format is indicated by 43, representing the currently-addressed MCS microinstruction. In addition to the NXA and EOP fields, discussed above, microinstruction 43 includes fields containing branching information (BR) and control fields (CTL) containing information necessary to control execution units and registers in executing an instruction. The control unit for the MCS 25 includes control logic 24a, a multiplexing unit 24b, and a control store address register (CSAR) 24c. The contents of the CSAR 24c provide the address input to the MCS 25, in response to which a microinstruction at the address is read out of the MCS 25. When available at the output of the MCS, the microinstruction has the format indicated by 43. Preferably, the MCS 25 includes pageable sections which can be fed from an auxialliary storage area in processor main memory that is reserved for processor use as necessary. The control logic 24a performs the essential function of providing the next instruction address to the MCS 25; a secondary function is to generate a page address and to control the entry of paged data into the MCS 25. The control logic 24a selects the next address component by control of the multiplexer 24b. Selection is implemented by the control logic 24a in response to the current address in the CSAR, the BR and NXA fields of the addressed microinstructions, and to conditions indicated by the state of the EOP field of the current microinstruction and branch conditions indicated in certain fields of a microinstruction in the address generation stage of the execution pipeline 32.

In operation, when an instruction has finished executing, the EOP bit will have forced the control logic 24a to multiplex the starting address of the next instruction into the CSAR 24c, leading to the readout of a first microinstruction. Thereafter, the branching, addressing, and EOP fields of the first microinstruction and any following microinstructions will produce the particular sequence of microinstructions designed to execute the instruction in the CIRL 20. If the sequence is a single instruction sequence, EOP bit of the first microinstruction will be set. Simultaneously upon the control portion of the instruction being placed in the execution pipeline 32, the control logic 24a will initialize the CSAR 24c to await the next instruction in the CIRL 20. If more than one instruction is contained in the sequence, the EOP field of the last instruction will initialize the CSAR 24c when the final instruction is put into the execution pipeline 32.

The main control store 25 contains microcode for instructions which can be compounded. In addition, this store contains microcode for instructions which are never compounded, interrupt handlers and miscellaneous microcode. Preferably, the address used in the MCS 25 is 16 bits, giving total addressable range of 64k words. All microcode residing from address zero to address 4095 is fixed; that is, once loaded during initialization, it remains in the MCS 25. Microcode at assigned address 4096 and above is demand-paged from an auxiliary storage in the CPU main memory (not illustrated) reserved for processor use.

The secondary control store 27 has an address space of 256 words. This address space has no relation to the MCS space. The SCS addresses 0 through 255 contain the first microword of every compoundable System/370 instruction. Addresses in the SCS 27 corresponding to noncompoundable instructions are used to contain microcode for second and succeeding, cycles of multi-cycle compoundable instructions. As FIG. 3 illustrates, the primary components of the SCS control unit are a multiplexing unit 26b and a control store address register (CSAR) 26c. The multiplexer is controlled by the merge unit 29 as described below. The format of microinstructions in the SCS 27 is indicated by reference numeral 45. In this regard, conditional branching in SCS microcode is not allowed, however a next address field (NXA) similar to that used in the MCS 25 is a convenient means for multi-instruction sequences. The smaller address space of the SCS 25 requires only provision of the OP code from the CIRR 21, and thereafter address data from the NXA field, if necessary. The set EOP bit in the currently-addressed microinstruction will initialize the contents of the CSAR 26c to prepare for receipt of the OP code of the next instruction in the CIRR 21.

MICROCODE GENERATOR OVERVIEW

The fundamental sequence of operations performed by the microcode generator of FIG. 3 includes five pipeline stages which permit the initiation of instructions into the pipeline each cycle. The first stage, IF, is instruction fetch. This stage is signified to the fetch and issue unit by the ENDOP signal from the microcode generator 23. Relatedly, in this stage, an instruction is fetched from the compound instruction cache or an instruction buffer. At the end of the IF cycle, one instruction or a pair of adjacent instructions are ready to be loaded into CIR 19 for decoding to begin instruction execution.

The second cycle or pipeline stage is called instruction decode (ID). This cycle is controlled by logic decoding of the CIRL 20 and, if appropriate, the CIRR 21. In this respect, logic decoding includes providing an instruction OP code to the appropriate control store and latching the OP code into the appropriate CSAR. Access of the first microinstruction needed to control subsequent stages of the pipeline is called "OP breakout". OP breakout consists of accessing control store using the OP code of the instruction to generate the microinstruction address. Storage addressing operands are fetched from a copy of the general purpose register array in this cycle if required.

The address generation (AGEN) cycle is used to calculate an effective address for operands needed from storage. Up to three address operands may be added. Operands to be used in the next cycle in an execution unit are accessed from the general registers in this cycle as well.

The execution (EX) cycle is used to perform operations in one or more execution units. This cycle is also used as a cache access cycle for instructions requiring storage operands. In most IBM System/370 processors, certain instructions, such as RX format adds, subtracts, and so on, require an EX cycle to fetch a second operand from storage followed by another EX cycle to compute the result.

The last cycle, termed the putaway (PA) cycle is used to store results from the EX cycle in the general purpose registers. Storage of data in the cache for STORE-type instructions may also occur in this cycle, provided they are not delayed by a subsequent fetch operation.

Inherent in the microcode generator of FIG. 3 is a microcode pipeline which mimics the pipeline for IBM System/370 instructions, except that there is no explicit ID cycle. Instead, the AGEN cycle immediately follows the fetch cycle of a microword. This is possible because the portions of the microinstruction used in the AGEN cycle are horizontal and require minimal decoding. The execution pipeline 32 includes the last three stages, each stage represented by one of three registers 32a, 32b and 32c. Following the sequence given above, the register 32a represents the AGEN cycle and includes an address instruction register (AIR). The microinstruction flows into this register from the merge unit 29 and is held in the register for one cycle of a pipeline clock to control AGEN cycle operations. In this regard, relevant control fields in the microinstruction which are necessary to control address generation are accessed. At the next pipeline clock cycle the microinstruction is transferred to the EX instruction register 32b where fields controlling execution unit operations are accessed. Last, the microinstruction is shifted at the next pipeline clock cycle to the putaway instruction register (PIR) 32c to control operations necessary to store results generated in the execution cycle.

Shift controls for the sequence of registers 32a, 32b, and 32c are conventional, as is pipeline clocking. The pipeline supports overlapped execution of machine instructions.

Figure 4:
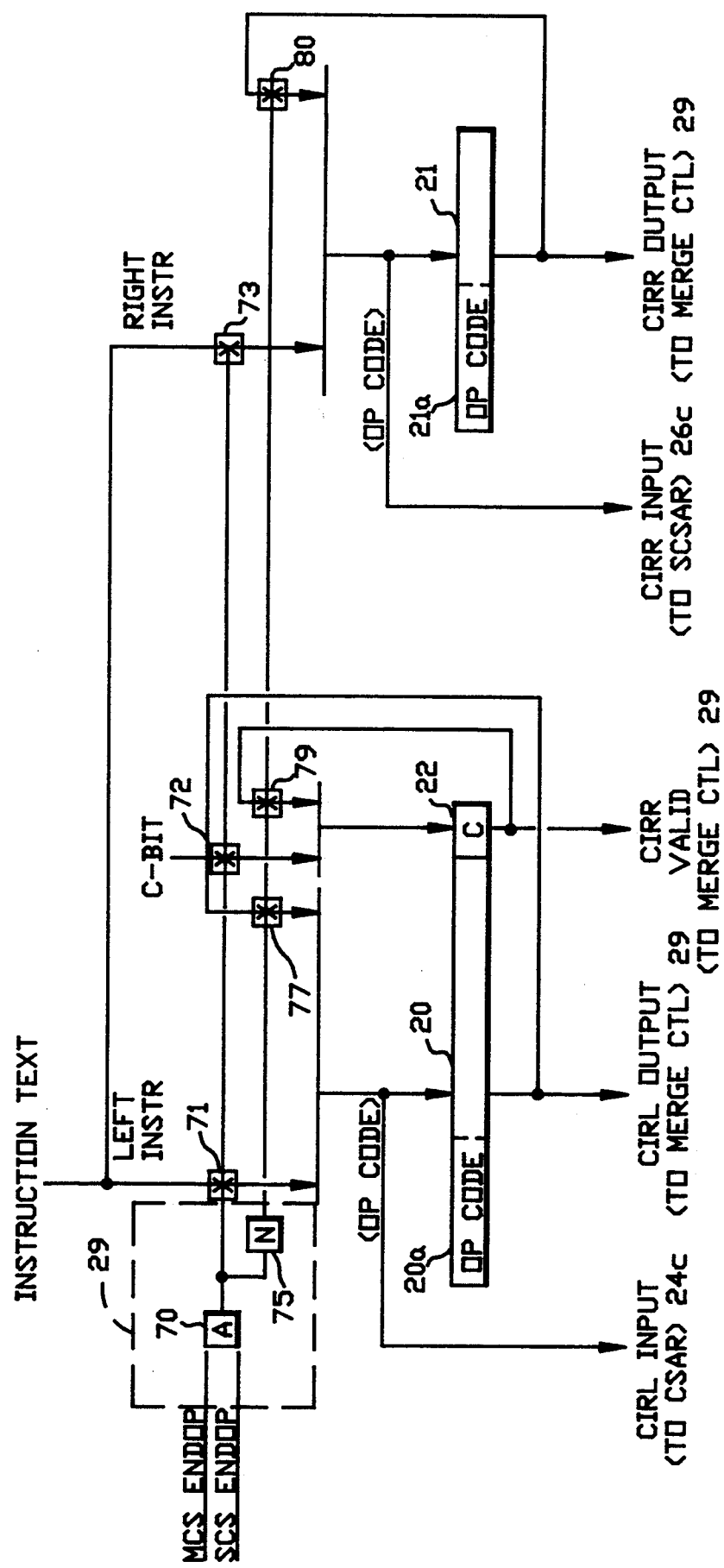
FIG. 4 is a schematic diagram showing details of a compound instruction register.

FIG. 4 is a schematic diagram showing control of the CIRL portions by the EOP fields of the MCS 25 and the SCS 27. These fields are decoded respectively to MCS ENDOP and SCS ENDOP signals. As described below, these signals are precursors of the ENDOP signal produced by the merge unit 29 to synchronize instruction fetch and issue in the unit 14. While either signal is low, indicating that a microinstruction sequence has not completed, the output of the AND gate 70 will be low. This disables the instruction gates 71, 72, and 73 preventing entry of the left instruction, its associated C-bit, and the right instruction into the CIRL 20 and CIRR 21. While the output of the AND gate is low, the inverter 75 keeps the gates 77, 79, and 80 active, which recirculates the contents of the CIR 19.

When the ENDOP signal is active, both the MCS and SCS ENDOP signals are active. In response, the fetch and issue unit 14 sends either a single instruction with its C-bit into CIRL 20, or the left instruction and its C-bit of a compounded pair of instructions into the CIRL 20 and the right instruction CIRR 21. The instructions and the accompanying C-bit are gated by the gates 71, 72, and 73. While being shifted into the compound instruction register, the OP codes are simultaneously registered in the CSARs. Entry into the compound instruction register drives the decode stage of the microcode generator. The OP code from the CIRL 20 is latched in the CSAR 24c and used for the initial OP breakout address operation. In a compounded pair of instructions, the OP code from the CIRR 21 is gated to CSAR 26c and used to access the SCS 27.

MICROINSTRUCTION MERGING

Figure 5:
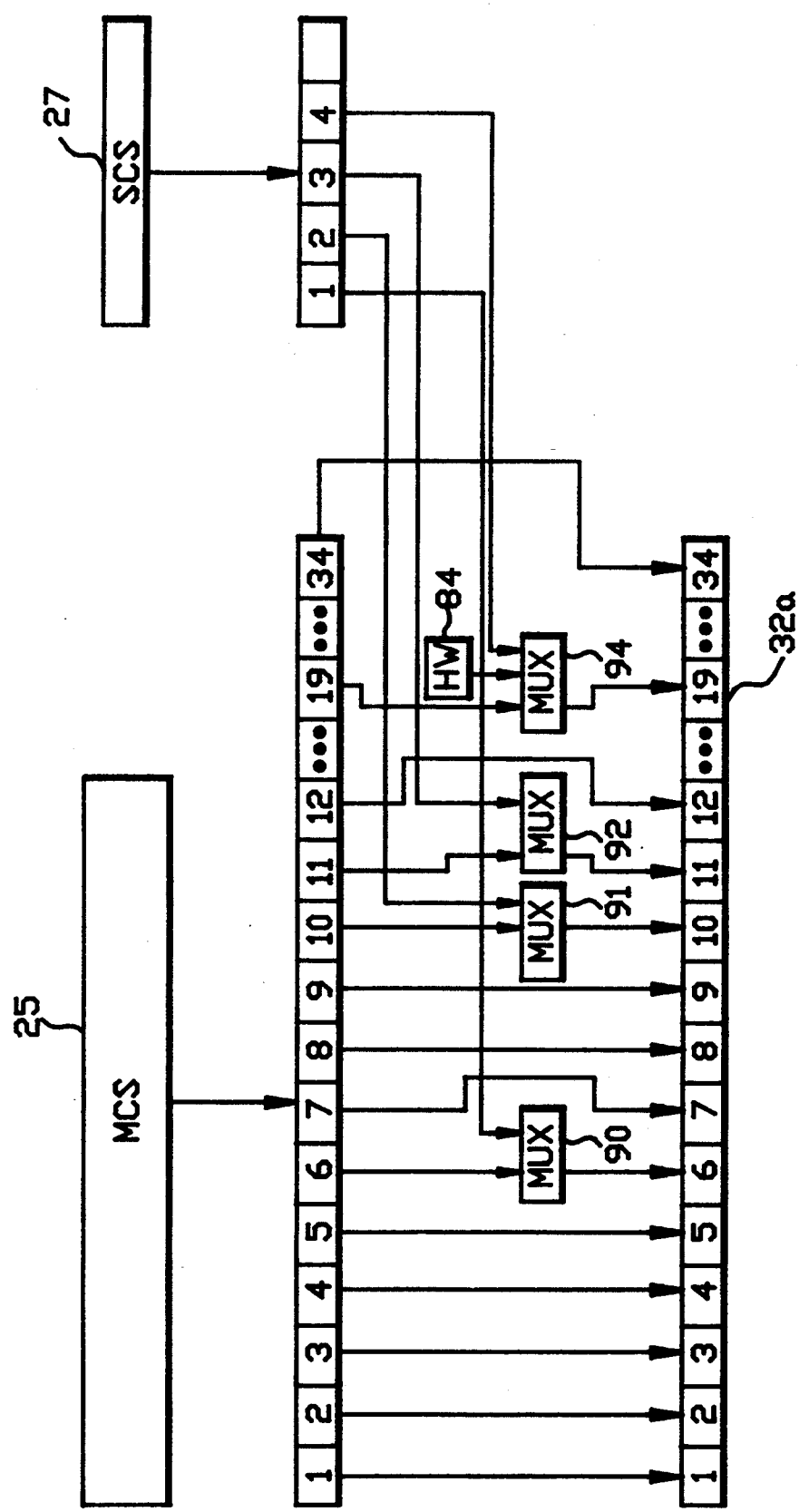
FIG. 5 is a schematic diagram showing in greater detail how two microinstruction sequences are merged in a merge unit in the apparatus illustrated in FIG. 3.

The MCS 25 contains complete microcode for all instructions, while the SCS 27 contains only the pieces of microinstruction needed for instructions which are compoundable as right-hand or second instructions, in a compounded pair. Merger, if necessary, is accomplished in the merge unit 29 as shown in FIG. 5. The task of the merge unit 29 is to generate a composite microinstruction by merging fields from the SCS 27 with fields from the MCS 25 and to generate other fields by decoding the contents of the CIRL 20 and CIRR 21. FIG. 5 shows the relevant fields of a merged mircoinstruction registered in the AIR 32a, which immediately follows the merge unit 29. In the SCISM embodiment, the complete microinstruction includes at least 34 fields. At least fields 1-5, 7-9, 12, and 34 are unchanged from their form in the MCS 25. At least fields 6, 10, 11, and 19 can be changed from their condition in the MCS 25 by the contents of corresponding fields in the SCS 27. In addition, field 19 can be altered from hardware (HW) 84 in the merge unit 29. The source of data for fields 6, 10, 11, 13, and 19 is determined by the state of multiplexers 90, 91, 92, and 94, respectively. The invention provides for specific actions by these multiplexers which generate a merged microinstruction.

The first action which is possible to form a merged microword is executed by substituting a field value from the SCS 27 for the value of a field in a microinstruction from the MCS 25. Direct substitution is warranted in control fields where it is known ahead of time that the hardware resource is dedicated to the execution of one of the instructions, and never needed by the other. In other words, it is not a shared execution unit. For example, the instruction in the CIRL 20 could have the form Add Register 5, 3, while the instruction in the CIRR 21 could have the form Add Register 1, 2. Assume that the first Add instruction uses execution unit 34 in FIG. 1, while the second uses execution unit 36. No forwarding of operands to the second execution unit is necessary, so the fields used to control operand fetching, and those used to control the second execution unit need not be modified from the state provided by SCS. The microinstruction in the MCS 25 for the left instruction has fields which control the execution unit 34 and the fetching of operands for that execution unit are coded to execute the instruction in normal fashion. The fields to control the execution unit 36 do exist in the microinstruction in the MCS 25, but are not needed to control execution of the first Add, since it executes in the execution unit 34 only. The microinstruction in the SCS 27 for the second Add instruction is always coded to use the execution unit 36, since the SCISM architecture requires execution of an Add Register as a second instruction to occur in this execution unit. Fields needed to control execution in the execution unit 34 do not exist in the SCS 27.

Figure 6A:
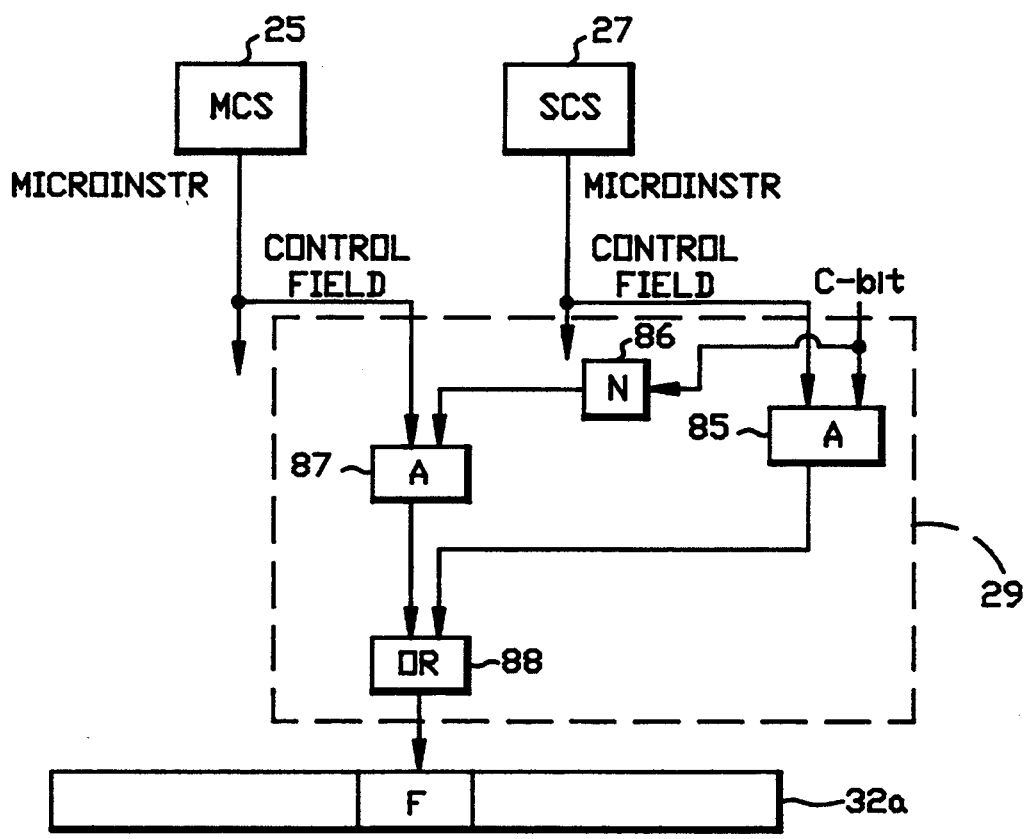
FIGS. 6A and 6B illustrate a detail of the merge unit for selecting microinstruction field information from one microinstruction two microinstruction sequences.

Execution of the second instruction of a compound instruction pair can never alter the execution of the first, so the microcode fields needed to execute the first instruction are always gated unchanged from the MCS 25 into the AIR 32a. In the case where, execution of the first instruction does not interfere with operand fetch or execution unit operation for the second instruction, the value for control field F in the SCS 27 which controls the second execution unit is directly substituted for the value of the F field coming from the MCS 25. Appropriate merge unit logic for field substitution in this manner is illustrated in FIG. 6A. Substitution of a field value from the SCS 27 by the merge unit 29 is implemented in an AND gate 85 controlled by the C-bit field of the CIRL. When the C-bit is set the AND gate 85 is enabled to provide the control value for the field F, and inverter 86 disables the AND gate 87, blocking the output of MCS 25. The OR gate 88 controls the entry into the F field location in the AIR 32a, receiving as inputs the output of the AND gate 85 and the AND gate 87.

Figure 6B:
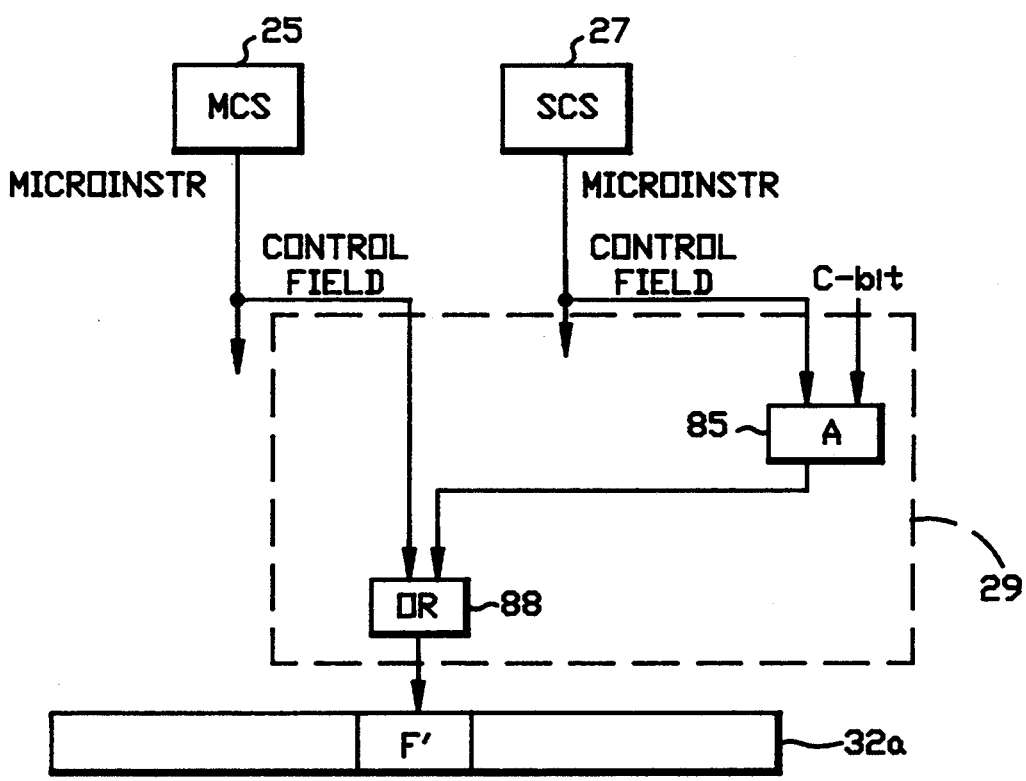

FIG. 6B permits either the MCS or the SCS to conveniently control a shared hardware resource, but with the limitation that both cannot control it simultaneously. The merge unit 29 has no a priori way to determine whether the left or right instruction will use the shared execution resource controlled by field F, rather this information is implicit in the setting of the C-bit. The operation of the circuit of FIG. 6B is similar to that of the non-shared resource example just described, with the exception that the default value of control field F' will be zero. The C-bit then merely enables AND gate 85, the output of which is ORed directly with control field F' currently addressed in MCS 25.

Assume now that the previous case is modified such that the result of the first instruction is required (logically) as an input to the second instruction. In order to absolutely limit the amount of memory required for the control stores, the SCS 27 contains only microwords necessary to support independent execution of instructions by the interlock-reducing unit. Therefore, in the face of a data interlock certain fields in the microinstruction which control operation of the interlock-collapsing execution unit need to be generated by logic rather than by using the SCS 27. For example, assume that the left instruction is SR 1,4 (subtract the contents of a register R4 from the contents of a register R1 and place the results in register R1). Assume that the second instruction is AR 3,1. Since the AR instruction follows the SR instruction, non-parallel execution of the instructions will find the SR instruction altering results in register R1 at the time the AR instruction executes. However execution of these instructions in parallel requires a control field for the interlock-collapsing execution unit which in effect tells the execution unit that it must combine three operands (R3+R1−R4) and place the contents in register R3.

Figure 7:
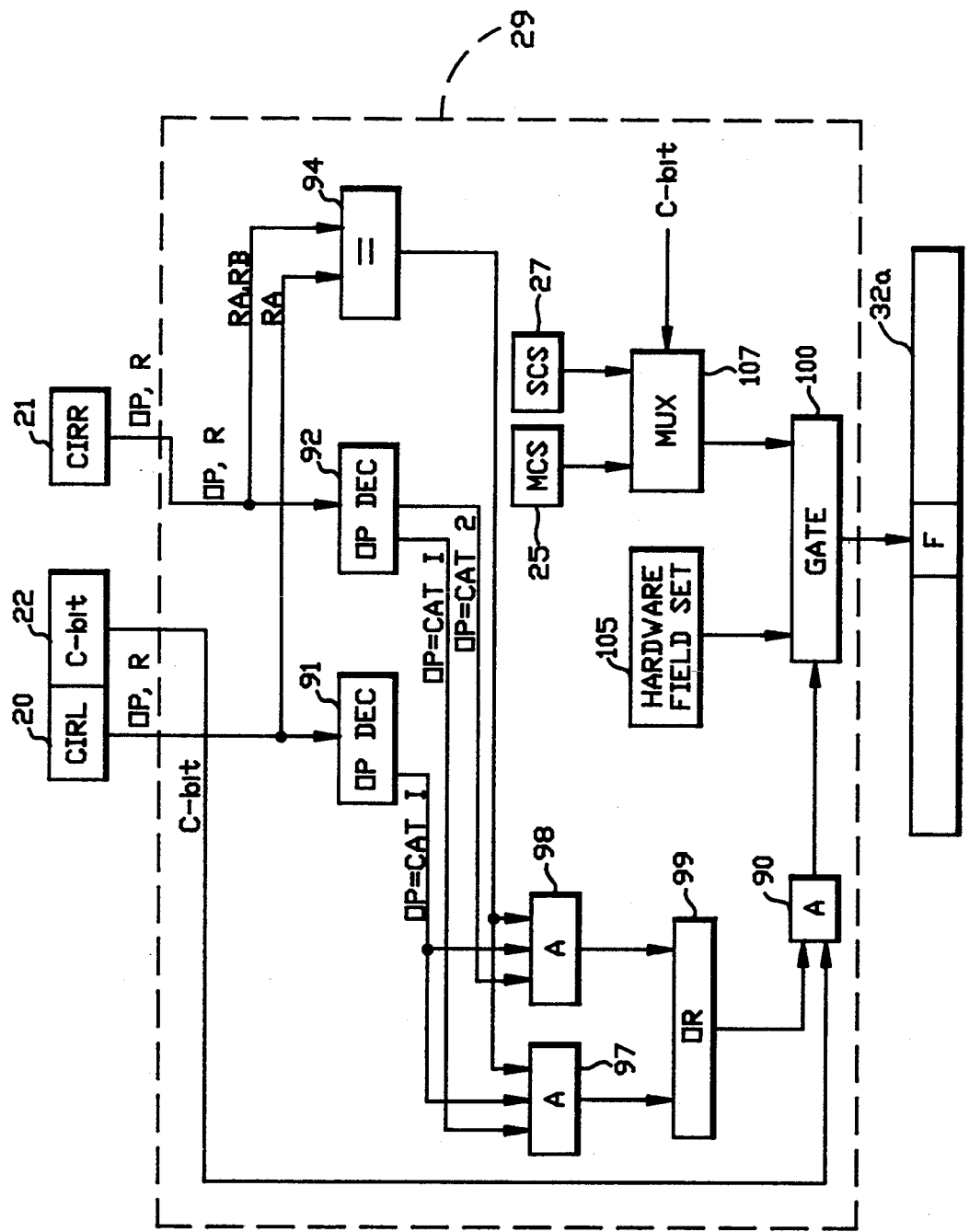
FIG. 7 illustrates a detail of the merge unit which selects microinstruction field information from a hardware source.

FIG. 7 illustrates how the merge unit 29 detects an interlock dependency and appropriately conditions a microinstruction field F controlling the second execution unit to indicate the interlock dependency case.

The structure and operation of FIG. 7 represents field value substitution in the merging unit 29 by means of hardware which recognizes an interlock condition existing between two instructions of a compounded pair. It assumes IBM System/370-type instructions. Thus for the SR and AR instructions discussed above, a data dependency can be discovered by inspection of the first two bytes of each instruction. This first byte of each instruction includes the instruction's OP code, while the second byte identifies the registers containing the instruction operands. The field substitution hardware in the merge unit 29 therefore must identify particular pairs of instructions and determine whether the two instructions are operating on a common operand. Particularly, if the instructions are compounded based upon rules which first categorize the instructions and then permit compounding between predefined categories, the merge unit 29 must be able to identify the categories and test for operand register equivalence.

These conditions are tested in FIG. 7. The operands of the left and right instructions are decoded, respectively, in operand decoders 91 and 92. If the decoder 91 looks only for category one (CAT I) instructions, it will activate its output when the left instruction is in that category. Assume that the right decoder 92 activates a respective signal when the right instruction is in one of a group of instructions categories which can be compounded with instructions in category one. The output of the left decoder 91 is fed then to each of plurality of AND gates 97, 98, with each AND gate also receiving a respective category validation signal from the right decoder 92. An operand testing circuit 94 receives the register identification fields (termed RA and RB) from each operand to test for data interlock between the instructions. The output of the detector 94 is activated only if the first register of the first instruction is identical with either register of the second instruction, said identity meaning that the result of the first instruction is logically required as an input for the second instruction. This output is also fed to the AND gates 97 and 98. An OR gate 99 collects the outputs of the AND gates 97 and 98, and the output of the OR gate 99 is fed to AND gate 90 which is enabled if the C-bit is a one. The output of AND gate 90 is fed to a GATE circuit 100. The GATE circuit 100 receives two inputs, one an input from a multiplexer 107 which conforms essentially to the substitution circuit illustrated in FIG. 6, and a second from a hardware field set circuit 105. The hardware field set circuit 105 operates to set the field F to a value appropriate for 3-operand operation of the execution unit 36 when an interlock situation occurs.

Thus, assume that the two instructions discussed above have been loaded into the CIRL 20 and CIRR 21, that both instructions are category one instructions, and that category one instructions are compoundable. The OP code of the right instruction is passed to the decoder 92 and the register field contents of the instruction is passed to the detector 94. At the same time, the OP code of the left instruction is provided to the decoder 91 and the operand register field contents to the detector 94. Since the left instruction is utilizing register R1 to store updated results and the right instruction is using the contents of register R1, interlock exists and the field value for the circuit 105 must be entered into F field in AIR 32a. This is accomplished by activation of the CAT I outputs from the decoders 91 and 92 and activation of the output from the detector 94. This activates the AND gate 97 whose output is fed through OR gate 99 to the input of AND gate 90. The output of AND gate 90 is fed to the control input of the gate 100. Gate 100 is designed to select the output of the circuit 105 when the output of the OR gate 99 is active. Therefore, the field F will be set to a value determined by the hardware circuit 105.

MERGING MICROINSTRUCTION SEQUENCES WITH UNEQUAL LENGTHS

Not all paired instructions require the same number of cycles to execute. Consequently a mechanism must be provided in the merge unit to accommodate the merging of microinstruction sequences of unequal length. Preferably, the present embodiment of the compounding preprocessor limits all paired or compounded instructions to one-, or two-cycle microinstruction sequences. In this regard, the instructions require one or two EX cycles. Depending on the pairing, the one-cycle microinstruction sequence may need to be executed during the first or second EX cycle of the two-cycle sequence. When the left instruction requires a single cycle, it is permitted to execute immediately. However, if the right instruction requires a single cycle, its microinstruction is delayed. In both cases, the unequal lengths are accommodated by synchronizing the ends of the sequences to the same pipeline clock period.

When the left instruction requires a single execution cycle, the first microinstruction for each operation is fetched in the instruction decode cycle and fed into the pipeline beginning at the AIR register 32a. In the last microinstruction of every microcode sequence, the EOP bit is set to signal the decoding hardware to begin decoding the next instruction. In the single-cycle instruction, this field activated. The next address field of each potentially-compoundable single cycle microinstruction sequence in the MCS 25 points to a no operation (NOP) microinstruction which has its EOP bit set. The NXA value for the NOP microinstruction points to the NOP microinstruction. The merge unit 29 fetches this NOP microinstruction from the MCS 25 and merges it with the second microinstruction fetched from the SCS 27 for the right-hand instruction in the pair during the second cycle. The NOP microinstructions may be merged with other microinstructions without interference. That is, it makes no use of data flow functions, so its control fields are coded with no-OPs or default codes. The last microinstruction of the sequence for the right instruction will also have its EOP bit set, and when EOP is detected for both sequences, the compound instruction is completed, and the pipeline advances to the next machine instruction.

Figure 8:
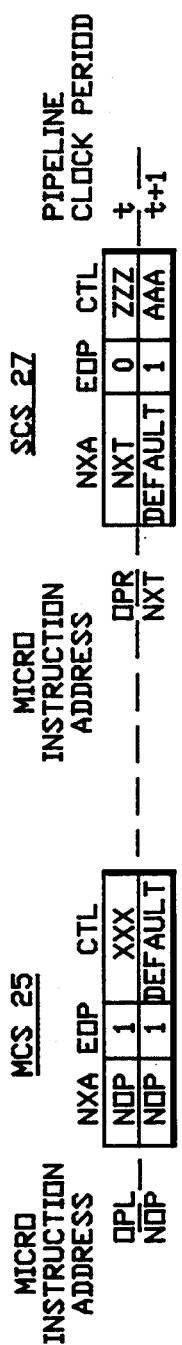
FIG. 8 illustrates how two merging microinstruction sequences of unequal length are simultaneously terminated in response to a first set of conditions.

The situation just described is illustrated in FIG. 8 where the outputs of the MCS 25 and SCS 27 are shown during two succeeding periods of the pipeline clock. These periods are labelled t and t+1. The left-hand instruction is the single-cycle instruction and the microinstruction pointed to by the left OP code (OPL) is coded with the pointer to the NOP instruction and its NXA field, with its EOP bit set, and with appropriate values in its control fields for execution of the left instruction. This microinstruction is output from the MCS at pipeline clock period t simultaneously with the first microinstruction of a multicycle sequence output from the SCS for the right instruction. The first SCS microinstruction is at the address location indicated by the OP code of the right instruction (OPR). The NXA field of the first SCS microinstruction has a pointer NXT to the address of the next microinstruction in the sequence, its EOP bit is set to zero, and its control fields are appropriately coded for execution unit 36. In pipeline clock period t+1, the NOP instruction is output from the MCS, while the instruction at address NXT is output by the SCS. Now the EOP bits for both sequences are set, permitting generation of the ENDOP bit by the merge unit, and fetching the next machine instruction.

Figure 9:
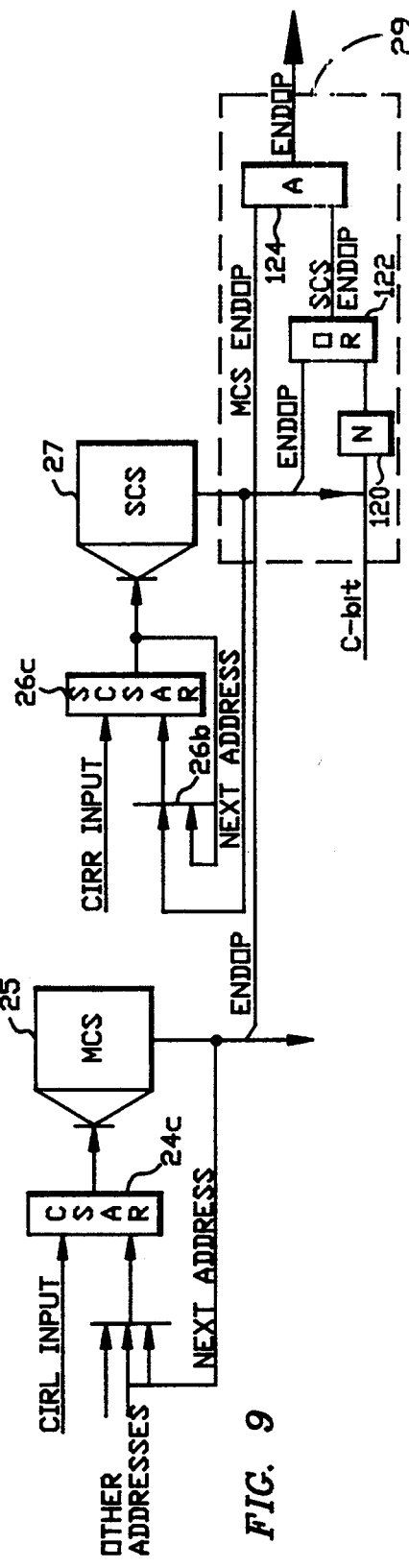
FIG. 9 is a schematic diagram illustrating a detail of the merge unit which performs the function illustrated in FIG. 8.

FIG. 9 illustrates the logic required to implement the ENDOP generation during the sequence-equalizing process illustrated in FIG. 8. In FIG. 9, the merge unit 29 includes an AND gate which receives the value in the EOP field of the MCS 25. The gate 124 also receives the OR gate 122. The OR gate 122 receives the EOP of the SCS 25 and also the C-bit value, inverted at 120. Now, assume that a left instruction requiring a single execution cycle is compounded with a right instruction requiring more than one execution cycle. The microinstruction sequence for the left instruction requires only a single microinstruction, while the sequence for the right instruction requires more than one microinstruction. During pipeline cycle period t, the first microinstruction from the MCS activates the EOP which is fed to the AND gate 124. However, the C-bit is inverted at 120 and EOP bit for the SCS 25 has not yet been set. Therefore, the output of the AND gate 124 is low, disabling the ENDOP signal. At pipeline cycle period t+1, the EOP output by the SCS 25 is activated, the output of the OR gate 122 rises, thereby activating the ENDOP signal output by the AND gate 124. Activation of the ENDOP signal synchronizes fetching of the next machine instruction to completion of all execution cycles required for the current compounded pair.

The significance of the inverter 120 is that when no valid instruction is in the CIRR 21, the SCS EOP is forced on, enabling the AND gate 124 to generate the ENDOP signal when the microinstruction sequence for the left instruction is completed, signified by activation of the EOP from the MCS 25.

The technique and mechanism for merging NOP microinstruction from the MCS with a microinstruction sequence from the SCS is not limited to the example shown. Generally, the appending of NOP microinstruction to a microinstruction sequence output by the MCS can be used whenever the MCS sequence is shorter than the SCS sequence. It is merely required that the NXA field of the NOP microinstruction point to itself.

An alternative implementation to FIG. 9 is to latch the EOP output by the MCS sequencer and hold it in a latch until EOP is also detected for the SCS sequence. During this period, the MCS-controlled fields of merged microinstructions can be zeroed or set to NOP default values.

Figure 10:
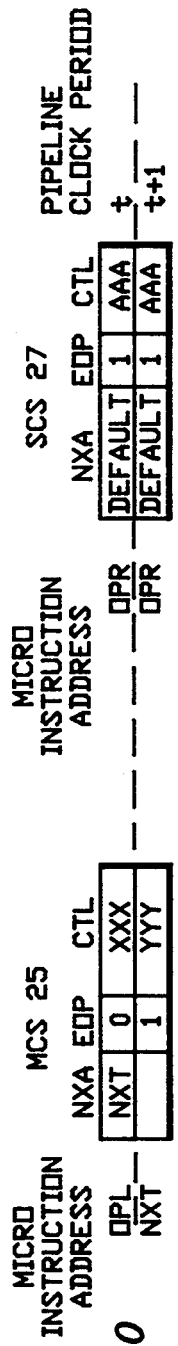
FIG. 10 illustrates how two merged microinstruction sequences of unequal length are simultaneously terminated in response to a second set of conditions.

FIG. 10 illustrates the condition where, in response to the issue of a pair of compounded instructions, the microinstruction sequence generated for the right instruction is shorter than that for the left. In this case, decoding of the right OP code (OPR) is delayed until after the first execution cycle of the left instruction. One reason for such delay would be if both instructions required access to a common resource. For example, if the left instruction were an RX-format ADD, two execution cycles would be required. The first would fetch an operand from storage, while a second would add the operands. Assume that the right instruction is an RX-format LOAD instruction. This is a single execution cycle instruction in which the second operand is fetched from memory and placed in a register. Delay of the single microinstruction sequence for the right instruction is required in order to avoid resource conflict with the first cycle of the RX ADD instruction. When a single microinstruction sequence for the right instruction is delayed to align with the last of a two-microinstruction instruction sequence for the left instruction, the procedure is illustrated in FIG. 10. The first microinstruction of the first sequence is obtained from the MCS 25 by decoding the left operand (OPL). The microinstruction at this address, available at pipeline clock period t, is entered into the AIR 32a. In the following period of the pipeline clock (t+1), the microinstruction at address NXT is available from the MCS. The single microinstruction of the sequence of the right instruction is at the SCS address obtained by decoding the OP code of the right instruction (OPR). Since the right and left instructions are entered into the CIR 19 simultaneously, the OP code for the right instruction is available at pipeline clock period t. In the example, the merge unit detects the occurrence of the potential for resource conflict and retains the OP code for the right instruction until pipeline period t+1. In the meantime, during clock period t, the SCS continues to output the microinstruction at the addressed location. Merging of the microinstruction from SCS is prevented during pipeline period t. This effectively delays merging of the one-cycle microinstruction from the SCS until pipeline period t+1.

Figure 11:
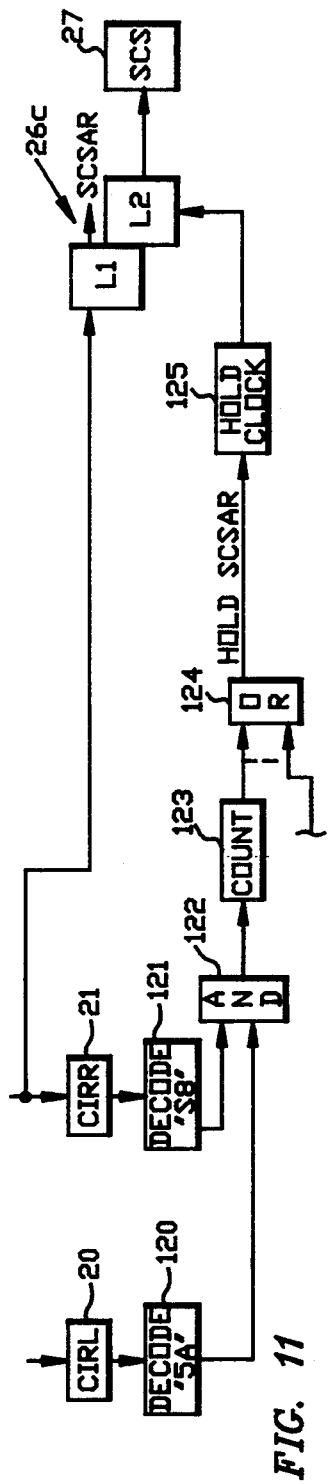
FIG. 11 is a schematic diagram illustrating a detail of the merge unit which accomplishes the procedure of FIG. 10.

FIG. 11 illustrates an implementation of the procedure of FIG. 10. Assume that the RX-format ADD instruction in CIRL 20 decodes to "5A" (hexidecimal) while the RX-format LOAD instruction decodes to "58". In this instance, the outputs of the decoders 120 and 121, respectively, are activated, activating the output of the AND gate 122. The AND gate 122 is fed to a counter 123 which counts the number of pipeline clock periods by which the OPR address is to be delayed. In this case, only a one period delay is required, implying that the counter 123 can be a latch which is set by activation of the AND gate 122 during pipeline clock period t and reset at the beginning of period t+1. The OR gate 124 collectes the outputs of other circuits which detect the occurrence of resource conflict between pairs of instructions and count down the number of clock periods necessary to expiate the conflict. The OR gate 124 activates its output in response to the resource conflict detection circuits which feed it. This output will remain active for a number of pipeline cycle clock periods counted by the respective counter which activates the OR gate. This output is labeled HOLD SCSAR. The HOLD SCSAR signal will remain active for as long as is required to resolve resource conflict. For so long as this signal is activated, a HOLD CLOCK circuit will prevent the provision of the pipeline clock to the SCSAR 26c. When the HOLD SCSAR signal is inactive, the clock is provided to the SCSAR and its contents are changed. This is represented by the LSSD latch pair L1/L2. This configuration assumes that the pipeline clock is a multi-phase signal in which the first phase is fed to the first latch section L1 of the CSAR 26c, while a second phase is fed to the second latch section L2. The HOLD CLOCK circuit 125 blocks provision of the clock phase which operates the L2 section of the SCSAR. Thus, when the OP code is available at the input of the CIR 21, it is latched into the L1 section of the SCSAR during the same period of the pipeline clock. Thereafter, it is held in the L2 section of the SCSAR if the hold clock signal is active. Following deactivation of the HOLD SCSAR signal, the L2 section of the SCSAR 26c latches the OP code of the next right instruction and the SCSAR 26c provides the address OPR to the SCS 27.

While the invention is particularly described with reference to a preferred embodiment, it is to be appreciated that the method focuses on the generation of microcode in a scalable compound instruction machine. Machine-level instruction sets, other than those executed by the IBM System/370, are contemplated. The scope of the invention also includes compounded instruction groups including more than two instructions.

I claim:

1. In a computer having a plurality of execution units in which object level instructions are executed singly in a scalar manner and in a group in a parallel, concurrent manner, and in which parallel execution of a group of object level instructions is indicated by compounding control information which is generated prior to fetching said object level instructions for execution, an apparatus for generating microcode that implements and controls execution of said object level instructions, said apparatus comprising:

compound processing means for generating said compound control information for said group of object level instructions prior to fetching said group of object level instructions for execution;

means for storing said group of object level instructions, including means for storing a first object level instruction, means for storing a second object level instruction, and means for storing said compounding control information indicating parallel execution of said first object level instruction and said second object level instruction;

means for storing a plurality of first microcode instruction sequences that includes a sequence of microcode instructions for executing each object level instruction that is executed by said computer singly in a scaler manner;

means for storing a second plurality of microcode instruction sequences that includes a sequence of partial microcode instructions for each object level instruction that is executed as a second instruction in a group of object level instructions;

means to map said first object level instruction to said means for storing a first microcode instruction sequence to fetch a first microcode instruction;

means to map said second instruction to said means for storing a second microcode instruction sequence to fetch a second microcode instruction;

means responsive to said first object level instruction, said second object level instruction and said compounding control information to merge said first microcode instruction and said second microcode instruction;

means coupling said means to merge said means for storing said first microcode instruction sequence and said means for storing a second microcode instruction sequence;

said means to merge including;

means to determine an execution resource dependency between said first microcode instruction and said second microcode instruction;

means responsive to said means to determine an execution resource dependency to substitute predetermined fields of said second microcode instruction into certain predetermined fields of said first microcode instruction to form a merged microcode instruction; and means for parallel execution of said merged microcode instruction connected to said means to merge.

2. The apparatus of claim 1, wherein
   said merging means includes multiplexing means connected to said first and second microinstruction storages for selecting microinstruction fields from said first and second sequences of microinstructions in response to said compounding information.

3. The apparatus of claim 1, wherein
   said first sequence of microinstructions includes a microinstruction with first fields for controlling instruction processing by one of said execution units of said first instruction and second fields for controlling instruction processing by one of said execution units of said second instruction:
   said means for pipelined execution including register means for receiving said microinstruction; and
   said merging means including multiplexing means connected to said first and second microinstruction storages and to said register means for entering field information from either said first sequence microinstructions or said second sequence of microinstructions into a second field of said microinstruction in response to said compounding information.

4. The apparatus of claim 1, wherein
   said number of microinstructions in said first sequence of microinstructions and said number of microinstructions in said sequence of microinstructions are unequal, said merging means including means for synchronizing said completion of said first and second sequences of microinstructions in response to said compounding information by adding at least one no-operation microinstruction to said first sequence of microinstructions.

5. The apparatus of claim 1, wherein
   said number of microinstructions in said first sequence of microinstructions in said number of microinstructions in said sequence of microinstructions are unequal, said merging means including means for synchronizing said completion of said second sequences of microinstructions in response to said first and second instructions by delaying said second sequence of microinstructions with respect to said first sequence of microinstructions.

6. A computer as in claim 1 further including hardware field setting means for generating a hardware microinstruction field indicating a particular operation of an execution unit, and multiplexing means connected to said hardware field setting means and to said merging means for selectively substituting said hardware microinstruction field for a field in said microinstruction in said first microinstruction sequence.

7. In a computer having a plurality of execution units in which object level instructions are executed singly in a scaler manner and in a group in a parallel, concurrent manner, and in which parallel execution of a group of object level instructions is indicated by compounding control information which is generated prior to fetching said object level instructions for execution, an apparatus for generating microcode that implements and controls execution of said object level instructions, said apparatus comprising:

means for storing said group of object level instructions, including means for storing a first object level instruction, means for storing a second object level instruction, and means for storing said compounding control information, which indicates parallel execution of said first object level instruction and said second object level instruction;

means for storing a plurality of first microcode instruction sequences that includes a sequence of microcode instructions for executing each object level instruction that is executed by said computer singly in a scaler manner;

means for storing a second plurality of microcode instruction sequences that includes a sequence of microcode instructions for each object level instruction that is executed as a second instruction in a group of object level instructions;

means to map said first object level instruction to said means for storing a first microcode instruction sequence to fetch a first microcode instruction;

means to map said second instruction to said means for storing a second microcode instruction sequence to fetch a second microcode instruction;

means responsive to said first object level instruction, said second object level instruction and said compounding control information to merge said first microcode instruction and said second microcode instruction;

means coupling said means to merge to said means for storing said first microcode instruction sequence and to said means for storing a second microcode instruction sequence;

said means to merge including;

means to determine an execution resource dependency between said first microcode instruction and said second microcode instruction;

means responsive to said means to determine an execution resource dependency to substitute predetermined fields of said second microcode instruction into certain predetermined fields of said first microcode instruction to form a merged microcode instruction; and means for parallel execution of said merged microcode instruction connected to said means to merge.

8. A computer as in claim 7 further including hardware field setting means for generating a hardware microinstruction field indicating a particular operation of an execution unit, and multiplexing means connected to said hardware field setting means and to said merging means for selectively substituting said hardware microinstruction field for a field in said microinstruction in said first microinstruction sequence.

9. In a computer having a plurality of execution units in which object level instructions can be executed singly in a scalar manner and in parallel in a concurrent manner and in which parallel execution of a group of object level instructions is indicated by compounding control information which specifies whether a group of object level instructions can be concurrently executed, an apparatus for generating microcode for said group of object level instructions, said apparatus comprising:

a first microinstruction storage for providing a first sequence of microinstructions for executing a first object level instruction of said group of instructions;

a second microinstruction storage for providing a second sequence of microinstructions for executing a second object level instruction of said group of instructions;

merging means connected to said first microinstruction storage and said second microinstruction storage;

said merging means forming a merged microinstruction in response to said compounding information from said first sequence of microinstructions and said second sequence of microinstructions by substituting a field from a microinstruction in said second sequence of microinstructions for a field in a microinstruction in said first sequence of microinstructions;

hardware field setting means for generating a hardware microinstruction field indicating a particular operation of an execution unit;

multiplexing means connected to said hardware field setting means and to said merging means for selectively substituting said hardware microinstruction field for a field in said microinstruction in said first microinstruction sequence; and means connected to said merging means for pipelined execution of said merged composite sequence of microinstructions.

* * * * *